Oct. 6, 1959

W. B. SPATZ 2,907,301

MARKING PENCIL

Filed July 1, 1957

INVENTOR,
WALTER B. SPATZ
By
Bernard Kriegel
ATTORNEY.

Oct. 6, 1959 — W. B. SPATZ — 2,907,301
MARKING PENCIL
Filed July 1, 1957 — 6 Sheets-Sheet 4

INVENTOR.
WALTER B. SPATZ,
BY Bernard Kriegel

Oct. 6, 1959

W. B. SPATZ 2,907,301

MARKING PENCIL

Filed July 1, 1957

INVENTOR.
WALTER B. SPATZ,
BY
Bernard Kriegel

Oct. 6, 1959     W. B. SPATZ     2,907,301
MARKING PENCIL Filed July 1, 1957     6 Sheets-Sheet 6

INVENTOR.
WALTER B. SPATZ,
BY
Bernard Kriegel

United States Patent Office 2,907,301
Patented Oct. 6, 1959

2,907,301

MARKING PENCIL

Walter B. Spatz, Los Angeles, Calif.

Application July 1, 1957, Serial No. 669,063

1 Claim. (Cl. 120—9)

This invention relates to marking pencils, and more particularly to relatively soft pencils or crayons, and to the combination of such pencils or crayons and holders or supporting members in which they are mounted.

The present application is a continuation-in-part of my application for "Marking Pencil," Serial No. 530,993, filed August 29, 1955.

An object of the present invention is to provide a pencil or crayon, such as an eyebrow pencil, adapted to be slidably keyed or splined in a supporting member for axial movement therein, and which will not tend to wedge or rotate in the supporting member when a sharpening device is applied to the end portion of the pencil.

Another object of the invention is to provide a polygonal pencil or crayon, such as an eyebrow pencil, capable of being pointed or sharpened by a rotating sharpener without inordinately high wastage of material, and in which fracturing of the corner segments of the polygonal pencil or crayon during the sharpening operation is minimized considerably.

A further object of the invention is to provide a pencil or crayon, such as an eyebrow pencil, adapted to be pointed or sharpened by a rotatable type of sharpener, in which the possibility of the pencil or crayon twisting off or otherwise failing under the action of the sharpening torque transmitted to it is reduced substantially, if not eliminated entirely.

An additional object of the invention is to provide a combination including a supporting member or holder and pencil or crayon slidably splined therein, in which the torque incident to sharpening of the pencil or crayon is distributed along a substantial portion of its length, rather than being concentrated thereon, thereby preventing the pencil or crayon from being twisted from the supporting member, or failing structurally at some point along its length.

Yet another object of the invention is to provide a combination including a supporting member or holder and pencil or crayon slidably splined therein, in which assurance is had that the pencil or crayon can shift axially relatively freely in the supporting member, being prevented from binding therein, and that the pencil or crayon will not fracture or otherwise break under the action of an associated sharpening device.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claim.

Referring to the drawings.

Figures 1, 2:
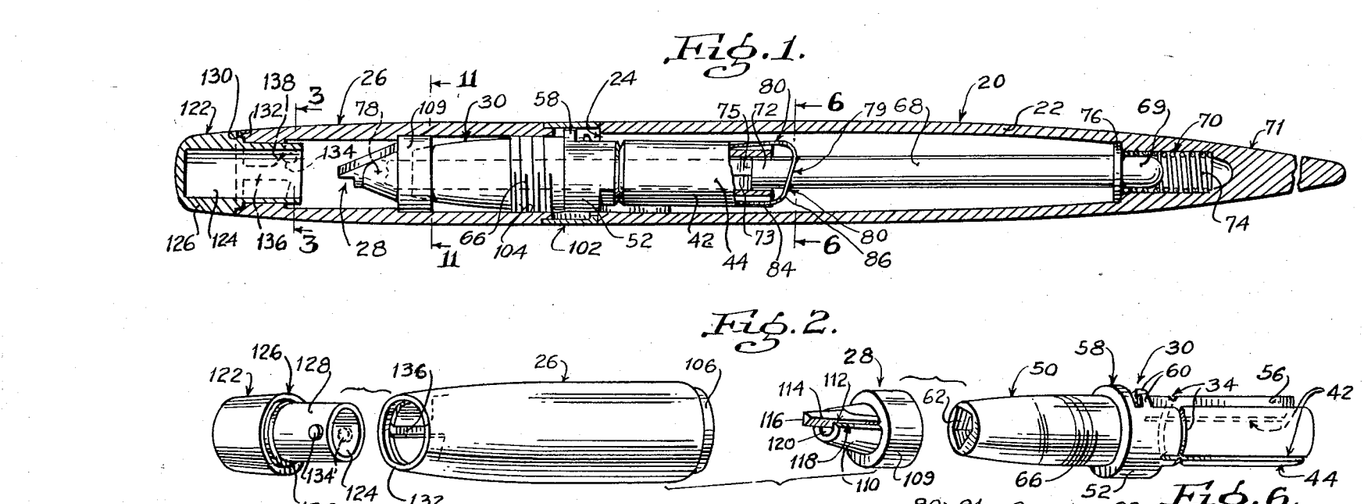
Figure 1 is an enlarged longitudinal section through my pencil pointer, certain parts being shown in elevation for clarity.
Fig. 2 is an exploded isometric view showing certain components of the device.

Referring particularly to Fig. 1, the pencil case 20 comprises an elongated hollow barrel 22 open at one end 24, and over which is adapted to be positioned a removable cap 26 having a sharpening means or pointer 28 mounted therein.

A nose or sleeve 30, see Figs. 1, 2, 7, 8 and 10, is mounted at the forward open end of the barrel 22 by inserting the rear portion 44 of the nose piece or supporting member into the barrel, the bore 38 of the barrel being provided with a rib 32 which engages a groove 34 in the nose piece to hold the same in fixed axial position in the barrel bore. The bore 38 of the barrel also carries a pair of diametrically opposed lugs 40 on the inner periphery thereof, the lugs mating with diametrically opposed longitudinal slots 42 on the rear portion 44 to prevent rotary motion of the nose piece 30.

The nose piece or supporting member 30 comprises an enlarged outwardly tapering forward portion 50, an intermediate flange 52 and the rear portion 44. Portion 44 (see Figs. 7, 8 and 10) has a lower longitudinally extending groove 54 therein and an upper longitudinal groove 56. The upper portion of flange 52 (see Fig. 2) is cut back to form a narrow flange 58 and a pair of spaced lugs 60 (see Figs. 7 and 8) are positioned on the top of the nose piece and separated a short distance from the upper flange 58. The nose piece or supporting member 30 has an internal bore 62 extending from end to end of said nose piece or sleeve. The cross section of the bore is non-circular or pentagonal, as indicated in Figs. 8 and 10, with straight sides 64. The front portion 50 of the nose piece is threaded as at 66 to receive cap 26.

A pencil support or pusher rod 68 is mounted axially in the barrel 22, and is supported for axial movement therein by positioning one end 69 of the rod in a pocket 70 formed at the closed narrow end 71 of the barrel. The rod 68 is cylindrical and is received within the pentagonal bore 62 of nose piece 30. The forward end 72 of the pusher rod is received in bore 62 with sufficient clearance to permit axial displacement of the rod within said bore. A pencil or crayon 73 having a non-circular or pentagonal cross section is matingly received within bore 62 so as to permit axial movement of the pencil in the bore. The flat end of the pencil abuts the end 72 of the pusher rod as at 75. It is seen that while the crayon 73 is slidable longitudinally in the bore 62 of the nose piece 30, the mating pentagonal or non-circular surfaces of the crayon with said bore prevents rotary motion of the crayon. A compression spring 74 is seated in pocket 70 about the end 69 of the pusher rod, the spring abutting a flange 76 on the rod and normally urging the rod and the pencil forward, to bring the point 78 of the pencil into operative engagement with the pointer 28.

The pusher rod 68 is provided with a releasable latching mechanism designated generally by the numeral 79, and comprising a U-shaped latching spring 80, note particularly Figs. 1, 5, 6, and 7, having one leg 82 longer and wider than the other leg 84, and an intermediate portion 86 bent at an acute angle somewhat less than 90° to leg 82, and at an obtuse angle somewhat greater than 90° to leg 84. The intermediate portion 86 is enlarged to provide an aperture 88 therein to receive the pusher rod 68, sufficient clearance being provided to permit the rod to move axially through said aperture with respect to portion 86 of the spring 80.

Leg 82 of spring 80 is positioned in the upper groove 56 formed in portion 44 of nose piece 30, and the outer end of the spring leg 82 is provided with ears 90 which are positioned between lugs 60 of nose piece 30, and the flange 58 (see particularly Figs. 7, 8 and 9), to secure leg 82 of the U-spring in position to prevent axial movement of leg 82. The outer edges of spring leg 82 at its junction 91 with the intermediate spring portion 86 are in abutting relation at 93 with the wall of bore 38 of the barrel, thus preventing displacement of spring leg 82 upwardly as viewed in Figs. 1 and 7. Leg 84 of spring 80 is positioned in the lower groove 54 of the nose piece 30, and the outer end of leg 84 is urged at 92 into abutting contact with a key 94. The key (see Fig. 4) has a large base portion 95 which carries a shallow step member 96 of a width and length shorter than the width and length of base portion 95. The base portion of the key slides in the lower groove or slot 54 in portion 44 of the nose piece 30, and the step member 96 slides in a shallow groove 97 of nose portion 44, the latter groove communicating with groove 54. The free end of the leg 84 of spring 80 rides at the upper end 98' of groove 54 in front of key 94, and the provision of the step member 96 on the key, which occupies groove 97, prevents the end of spring leg 84 from jamming into groove 97 between the key and the nose piece. The base portion 95 of the key is provided with an end portion 99, a shallow stepped end portion 101 and an intermediate notch 103 permitting the key to slide over the rib 32 on the wall of the barrel bore 38. The shoulder 99 on the end portion 99 of the key (see Fig. 7) limits longitudinal motion of the key.

The intermediate portion 86 of spring 80 extends beyond the rear portion of nose piece 30. When the spring 80 is in normal position, the opposite peripheral edge portions 98 of the aperture 88 in the central portion 86 of the latching spring (see particularly Figs. 5 and 6) abut the adjacent peripheral portions 100 of the pusher rod 68, causing a binding action between these contacting surfaces of the rod and spring, and holding the rod 68 in latched position to prevent axial movement thereof under the action of coil spring 74.

Figures 3, 4, 5:
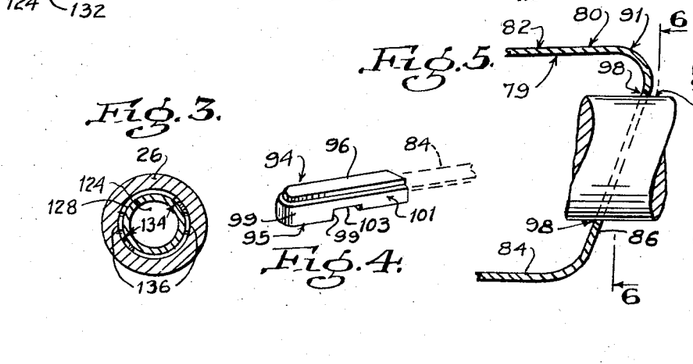
Fig. 3 is a section taken along the line 3—3 on Fig. 1.
Fig. 4 is a perspective view of the key.
Fig. 5 is an enlarged detail of the latching spring and pusher rod combination.
Figure 6:
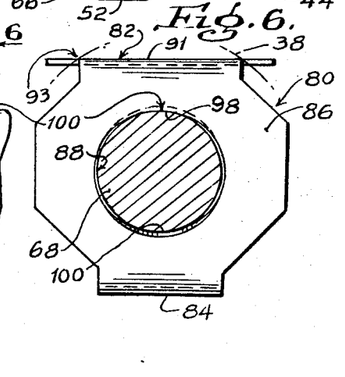
Fig. 6 is a view taken along the line 6—6 on Figs. 1 and 5.
Figure 7:
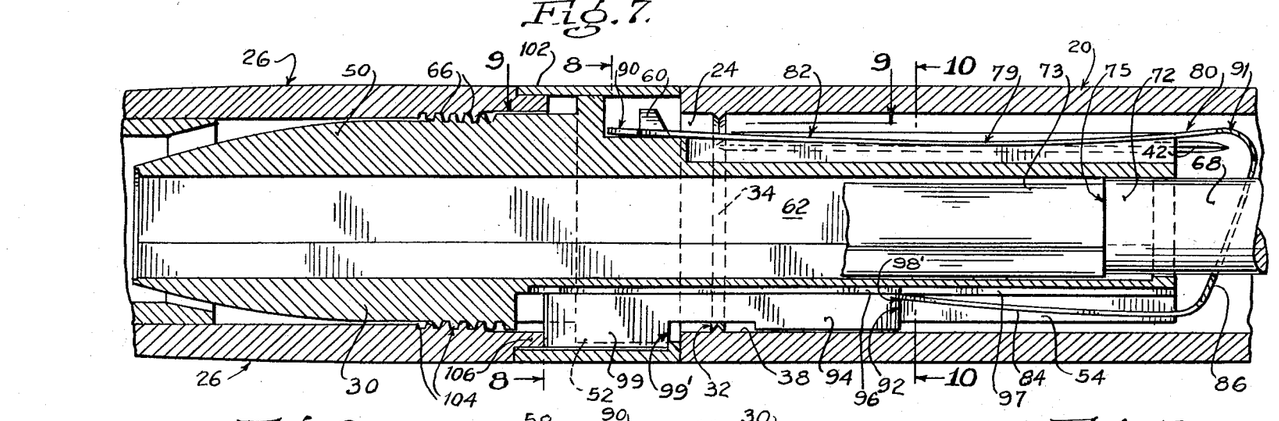
Fig. 7 is an enlarged sectional view of a portion of the device of Fig. 1.
Figures 8, 9, 10:
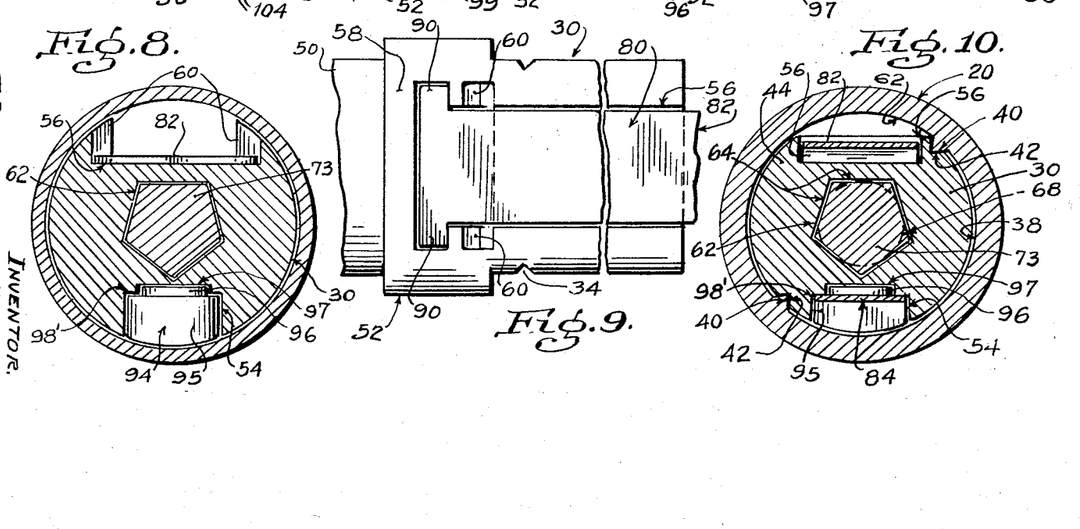
Fig. 8 is an irregular section taken along the line 8—8 on Fig. 7.
Fig. 9 is a partial plan view taken along the line 9—9 on Fig. 7.
Fig. 10 is a section taken along the line 10—10 on Fig. 7.

However, when the key 94 is urged to the right as viewed in Figs. 1 and 7, the leg 84 of the spring 80 is pushed forward, causing the spring 80 to flex in a direction to rotate the intermediate portion 86 of the spring, as seen in Figs. 1, 5 and 7, counterclockwise about 91 as a fulcrum point, thus freeing the surfaces 98 and 100 from contact with each other, and unlatching the pusher rod from its fixed position with respect to spring portion 86 and permitting the pusher rod 68 to move freely in an axial direction through the aperture 88 in the central portion 86 of said spring. A ring 102 is press fitted about flanges 52 and 58, and about the outwardly extending portion 99 of key 94, thus covering the exposed portion of the key extending beyond the open end 24 of the barrel, and preventing accidental actuation of the key by the fingers while handling the case.

Cap 26 containing the pointer 28 has internal threads 104 which mate with the external threads 66 provided on the forward portion 50 of the nose piece 30, providing a cam interconnection for securing the cap to the nose piece and over the open end 24 of the barrel 22. When the cap is screwed onto the nose piece, as viewed in Figs. 1 and 7, a flanged end portion 106 of cap 26 passes under ring 102 and makes contact with the key 94, urging it to the right and unlatching the latch spring 80 as described above, permitting coil spring 74 to urge the pusher rod 68 and the pencil or crayon 73 to the left, and thus urging the point 78 of the crayon into the pointer 28.

Viewing Figs. 1, 2, 11, 12, 13 and 14, the pointer 28 is mounted on a cylindrical support 109 press fitted into the interior of cap 26 and abutting a shoulder 111 therein. The pointer is in the form of a truncated hollow cone 110 having a slot 112 intersecting the surface of the cone and connecting the interior of the cone with the exterior of the cone, one edge 114 of the slot being defined by the surfaces 115 of a wedge 116 formed integrally with the cone. The edge 114 of the wedge forms a cutter edge and protrudes a short distance as at 118 into the interior of the hollow cone beyond the interior conical surface 119 of the cone. The truncated cone is apertured at 120 in a plane perpendicular to the axis of the cone, the wedge 116 extending upward beyond said plane and through said aperture to a point 121. Apex 123 of the cone (see Fig. 12) is eccentric of the axis Y of the barrel and of the crayon positioned in said barrel, and the axis X of the cone is tilted about one degree to the Y axis. The wedge 116 is in the shape of a frustrum of an oblique pyramid, i.e. the triangular cross section of the wedge 116 increases in area from the outer end thereof towards the cone and intersects the cone to produce a flat inner surface 121' adjacent the inner surface 119, and the protruding cutting edge 114 at the face of the slot. The wedge 116 also gives mass and rigidity to the cutter permitting the rest of the cone to be of light construction.

It is thus seen that as the cap is rotated and screwed onto the nose piece 30, the pointer and cone 110 thereof are also rotated to sharpen the point 78 of the crayon as it is urged into the cone by the pusher rod 68 under the action of spring 74, forming a conical point 78 on the pencil or crayon. During this sharpening period, because of the eccentricity of the apex of the cone and the tilting of the axis of the cone with respect to the axis of the barrel and the pencil or crayon 73, a load is exerted downwardly against the crayon, as viewed in Figs. 1, 7 and 12, to press the pencil 73 near the base of the conical point against the adjacent lower section 110' of the cone 110 in nose piece 30. This action tends to hold the pencil or crayon firmly within the cone to prevent excessive bending load on the pointed end and to prevent the crayon breaking at its weakend section.

Figures 11, 12, 13, 14:
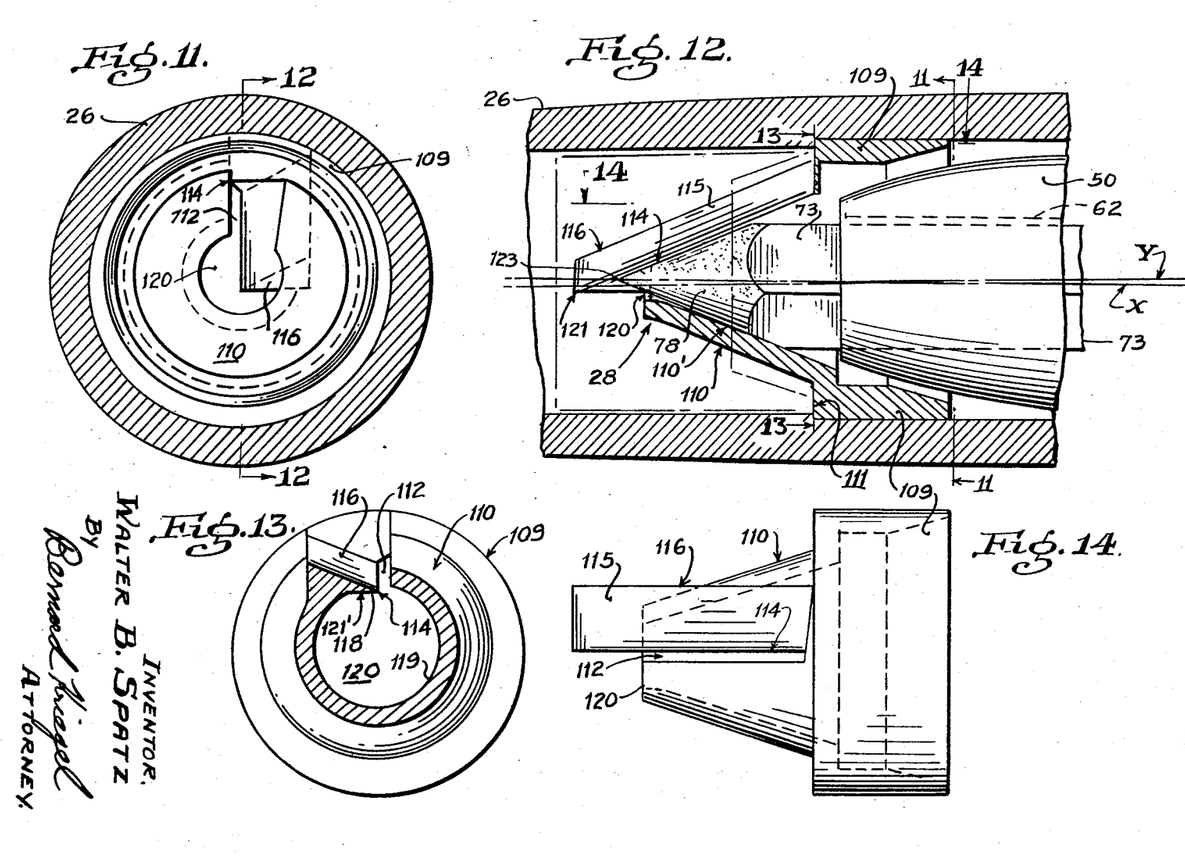
Fig. 11 is an enlarged cross-sectional view taken along the line 11—11 on Figs. 1 and 12, looking into the cutter from the rear thereof.
Fig. 12 is a longitudinal sectional view taken along the line 12—12 on Fig. 11.
Fig. 13 is a section taken along the line 13—13 on Fig. 12.
Fig. 14 is a plan view taken along the line 14—14 on Fig. 12.

Due to the tilting of the axis X of the cone 110 and the position of the cutter edge 114, the region 110' where contact is made with the crayon is not necessarily diametrically opposite to the cutter 114. As the cutter is rotated it bites into the crayon to cut a chip thus introducing a lateral force on the crayon. Since the cutter edge 114 travels around the crayon the cutter tends to cause a circular wobble of the crayon. The degree of wobble is materially reduced from that which would be produced by the cutter if mounted in a cone which was axially coincident with the crayon and with a cutter protruding into the interior of cone to the depth cut desired. I, however, materially reduce this degree of wobble by radially displacing the apex of the cone from the axis of the barrel and crayon, as shown in Fig. 12. The extent to which the apex is displaced controls the degree to which the wobble is reduced. In a practical observation I have found that a displacement of approximately half the depth of cut produces optimum results in that it minimizes the degree of wobble and the efficiency of cut is maintained.

The slot 112 of the pointer cone 110 is made narrow, and is of a dimension such that it is sufficiently large to permit chips cut from the pencil to pass into the cap 26, but is small enough to prevent these chips from dropping back into the cone 110. (See B-2). It is seen that except for the slot 112 and aperture 120, there is no communication between the interior of the cap 26 and the exterior of the cap, the outer end of which is provided with a removeable closure 122 (see Figs. 1 and 2).

The closure 122 has a bore 124 and comprises an enlarged closed cylindrical end portion 126 and an open end portion 128 providing communication between the interior of the cap and the bore 124. Between end portions 126 and 128 is a stepped shoulder 130 which mates with the stepped end 132 of the cap 26, and the end portion 128 of the closure 122 has a pair of diametrically opposed pins 134 thereon, which are adapted to slide in diametrically opposed slots 136 positioned on the inner wall at the end of cap 26 (see also Fig. 3), when the closure is fitted onto the cap, with the end portion 128 of the closure sliding into the end of the cap as seen in Fig. 1. When the stepped shoulders 130 and 132 of the closure and cap are in abutting relation, the pins 134 will have moved to the right end of slots 136, as seen in Fig. 1, and rotation of the closure will lock the closure onto the cap by abutment of the pins with the shoulder 138 on the inner surface of the cap 26.

When the cap 26 is unscrewed from the nose piece 30 following the sharpening operation, the intermediate portion 86 of latching spring will be rotated clockwise about fulcrum point 91 of the spring, urging leg 84 of the latching spring and the key 94 to the left as viewed in Figs. 1 and 7, latching the pusher rod 68 so that it is restrained against outward movement as described above. The removal of the cap 26 causes the pointer 28 to impart a frictional drag on the crayon 73, rotating it so as to force its apices at the intersection of the plane surfaces thereof against the flat surfaces of the mating pentagonal bore 62, to produce a wedging action tending to hold the crayon in the bore after the cap is removed. Also, when the cap is entirely removed, the crayon is further restrained against axial movement out of the pencil case by adhesvie tension at 75 between the flat end of the tacky crayon and the abutting end of pusher rod 68.

The crayon, following the removal of the cap, protrudes a substantial distance beyond the forward portion 50 of nose piece 30, as indicated particularly in Fig 12, facilitating manipulation of the crayon in use. It is further noted that the key 94 and the latch spring 80 are completely covered by my closure ring 102, and cannot be operated except by the cap 26, thus protecting against accidental release of the latch while the crayon is being used as an eyebrow pencil, avoiding injury to the eye by ejection of the crayon. The crayon is thus maintained in proper position in the pencil case during use and is prevented from shooting out of the case by my novel latching mechanism.

The structural components of my device can be constructed of any suitable material such as metal or plastic. For example, case 20, cap 26, nose piece 30, and key 94, as well as other elements of my device can be conveniently formed of molded plastic.

It is to be noted that the pencil or crayon 73 and the associated internal bore 62 of the nose-piece or supporting member 30 are pentagonal in cross-section, with the sides of each pentagon being substantially equal. The pentagonal cross-sectional shape of the pencil 73 and of the associated bore 62 of the supporting member is indispensable to the proper functioning of the apparatus. For reasons that will be set forth, polygonal cross-sections having more than five sides will not function properly, which is also true of polygonal cross-sections having less than five sides. This is especially true in connection with pencils made of relatively soft material, such as eyebrow pencils or soft crayon.

In actual practice, the eyebrow pencil of pentagonal shape has an inscribed circle 200 which is only about ⅛-inch in diameter. Because of accumulation of manufacturing tolerances in the production of the sharpening apparatus illustrated, and because of other practical considerations, the inscribed circle 201 of the associated pentagonal bore 62 in the supporting member 30 must be at least 0.016 inch greater than the inscribed circle of the polygonal crayon. In the actual manufacture of the apparatus disclosed, it is found that the inscribed circle 201 of the pentagonal bore is about 0.020 inch greater than the inscribed circle 200 of the pentagonal pencil or crayon 73. The diagrammatic views illustrated in Figs. 15 to 18, inclusive, are drawn to scale as indicating a clearance 202 between each side 203 of the pentagonal pencil and the associated side 204 of the bore of the supporting member of about 0.008 inch. In other words, assuming the inscribed circle 200 within the pencil to be drawn on a scale corresponding to an actual ⅛-inch diameter circle in an actual pencil, the inscribed circle 201 within the pentagonal bore of the supporting member will be drawn to a scale representing an additional 0.016 inch in diameter.

Turning now to Figs. 19 to 22, inclusive, a pencil 73a of hexagonal cross-section is represented with an inscribed circle 200a corresponding to ⅛-inch in diameter. Similarly, a companion hexagonal bore 62a in the supporting member 30a is represented having an inscribed circle 201a of a diameter which is greater than that of the inscribed circle 200a of the pencil by 0.016 inch.

In Figs. 23 to 26 inclusive, a pencil 73b of square cross-section has been represented having an inscribed circle 200b corresponding to ⅛-inch, the companion square bore 62b in the supporting member 30b having an inscribed circle 201b which is greater than that just indicated by 0.016 inch.

Figure 21:
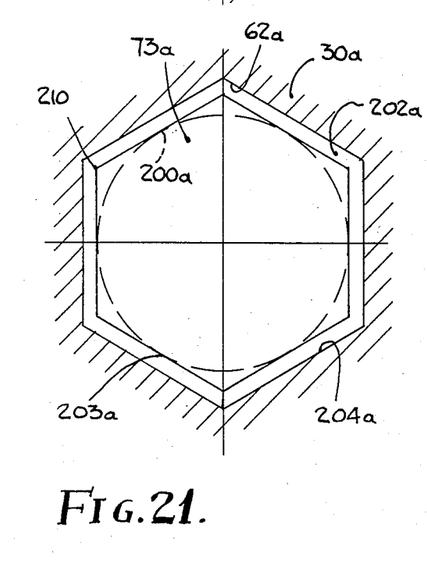
Figure 22:
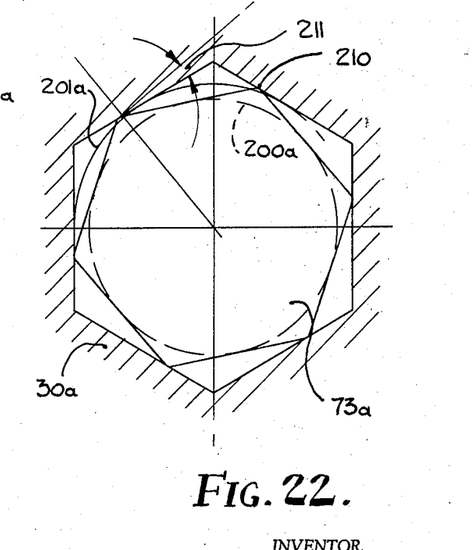

In Fig. 21, a hexagonal pencil 73a, having sharp corners or vertices 210, is illustrated spaced uniformly from the associated walls 204a of the hexagonal socket 62a in the supporting member. When the sharpener 28 is rotated to produce the point 78 of the pencil, the supporting member 30a is held stationary, the torque between the sharpener and the point 78 of the pencil turning the latter within the supporting member 30a until the corners 210 engage the sides 204a of the hexagonal bore, such as represented in Fig. 22. The torque or force transmitted between each edge 210 and the associated contacting wall 204a is acting at a relatively shallow angle 211 to this wall. Since the crayon or pencil is made of relatively soft material, as in an eyebrow pencil, the edges 210 can be deformed by the force of engagement against the walls of the bore, to the extent permitting the pencil 73a to rotate within the companion hexagonal bore or socket 62a. It will be noted from Fig. 21 that each corner 210 of the pencil 73a extends outwardly of the inscribed circle 201a of the hexagonal bore to only a very slight extent, and that such corner can very easily be displaced laterally when shifted against the side wall 204a of the hexagonal bore, particularly in view of the shallow angle of attack 211 of the corner against such side.

Depending upon the characteristics of the material of which the pencil 73a is made, it may either twist through or rotate within the bore 62a of the companion supporting member 30a through loss of the vertices or crests 210 of the pencil, or if such action does not occur, then the crests or vertices will wedge against the adjacent hexagonal sides 204a of the supporting member because of the shallow or small angle of attack 211 of each crest against the side of the supporting member.

This wedging action will then prevent axial forward feeding of the pencil within the bore 62a of the supporting member 30a under the action of the spring 74 and its associated plunger 68, which are urging the pencil in a forward direction against the sharpener 28. Such wedging action will make the pencil inoperable, since the the forward end of the pencil must be projected to the proper extent beyond the forward end of the supporting member 30a for the sharpening action to occur.

If the pencil and associated bore of the supporting member are made with more than six sides, then the foregoing situations are aggravated, since the crests or vertices then extend a still smaller extent beyond the inscribed circle 200a of the polygonal bore, and the angle of attack or action of each crest against an associated wall of the bore is then making a still shallower or smaller angle thereto. Accordingly, twisting through or rotation of the pencil in the bore, or its wedging against the wall of the polygonal bore, is enhanced.

The foregoing comments are actually aggravated to a still greater extent in connection with polygonal cross-sections of pencils and associated bores having six or more sides under actual conditions. As disclosed in Figs. 19 and 20, the corners or vertices 210a of the crayon 73a actually are not sharp, as disclosed in Figs. 21 and 22, but are somewhat rounded or dubbed. Thus, the extent of outward projection of such corners 210a beyond the inscribed circle 201a of the bore of the supporting member is less than indicated in Figs. 21 and 22. Accordingly, as the pencil 73a is turned angularly within the bore 62a when being sharpened, the angle of attack 211 of each corner against the companion side wall 204a of the bore is less than indicated in Fig. 22, making it possible for the material disposed within the pencil 73a to either be wedged within the bore 62a as a result of the torque transmitted between the pencil and the walls 204a of the confining bore, or making the crests 210 of the pencil easier to twist through and ride past the walls 204a of the bore, the pencil no longer being splined to the supporting member 30a. It will no longer be coupled against rotation to the supporting member 30a, while permitting axial movement of the pencil within the supporting member.

Figure 25:
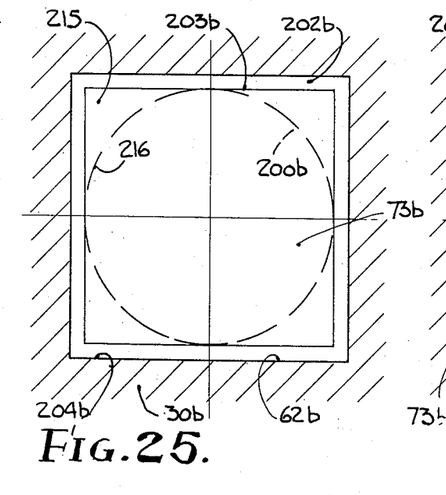
Figure 26:
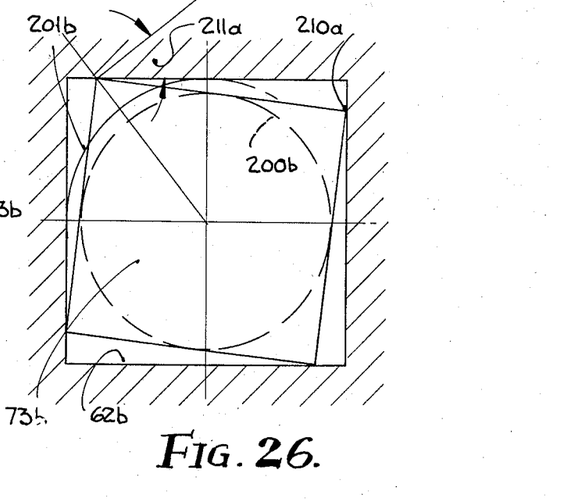

Assuming the pencil or crayon 73b and associated bore 62b of the supporting member 30b were made of a square cross section, such as illustrated in Figs. 25 and 26, with a clearance 202b required of about 0.008 inch on a side, the tendency for the crayon to either rotate through the companion bore or socket, or to become wedged therein, would not be present, since the angle of attack 211a of each corner 210a against the associated sides 204b of the bore of the supporting member would be much greater than occurs with the hexagonal device illustrated in Figs. 19 to 22, inclusive. However, the square cross-section crayon 73b is exceedingly wasteful of material, since it is only the material disposed within the circle 200b inscribed within the square cross-sectional pencil which is available for use, in view of the fact that the sharpener 28 must remove the corner segments 215 of the pencil bounded by the intersecting sides 203b of the square and the associated arc 216 of the inscribed circle 200b. Accordingly, such corner segments 215 which constitute a considerable portion of the entire volume of the pencil, must be sharpened away by the cutting edge 114 of the sharpening device 28.

Difficulty is encountered in sharpening away such corner segments of the square cross-section crayon or pencil, since they are oftentimes not reduced to relatively small chips by the edge 114. The ninety degree crest or corner represented by intersecting square sides of the crayon is relatively sharp and weak. As a result, the edge 114 actually fractures the corner segments 215, which then break off in relatively large pieces, rather than being cut away to produce the desired conical point 78 at the forward end of the pencil. In some instances, a relatively large piece or chunk may break out of the body of the crayon. In addition, a greater torque is required in sharpening the square cross-section crayon 73b, which results in the application of greater force to the crayon, making its structural failure more likely.

Figure 23:
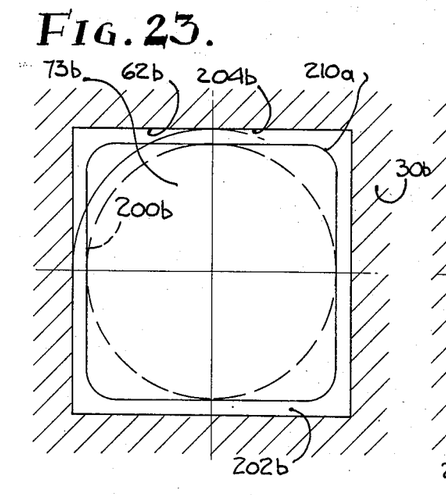
Figs. 23 to 26, inclusive, are views corresponding to Figs. 15 to 18, inclusive, of still another cross-sectional shape of pencil and associated supporting member.
Figure 24:
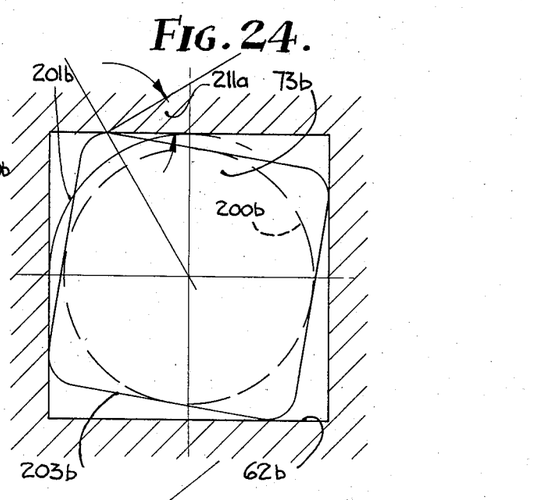

As illustrated in Figs. 23 and 24, the corners 210a of the crayon are rounded. With such rounded corners, a large quantity of material is still wasted. The sharpener 28 itself still tends to fracture the crayon, rather than reducing it to chips.

A pencil or crayon of triangular cross-section would be still more wasteful of material than the rectangular cross-section illustrated in the drawings, inasmuch as only the inscribed circle within the triangle would be available for application to the skin of the person, as when an eyebrow pencil of triangular cross-section is used. The sixty degree included angle between the sides of the triangle, which would be presented to the cutting edge of the sharpener, would be still weaker than the ninety degree angle between the intersecting sides 203b of the square cross-section pencil, enhancing the fracturing propensities of the pencil under the action of the cutter or sharpener 28.

Figure 17:
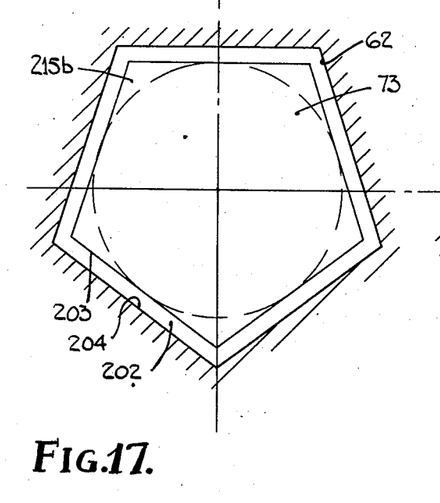
Figure 18:
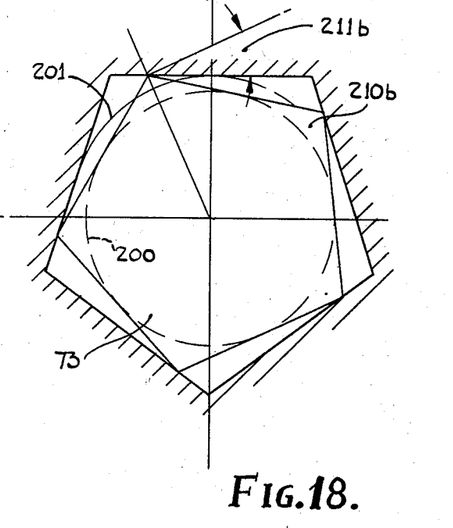
Figure 19:
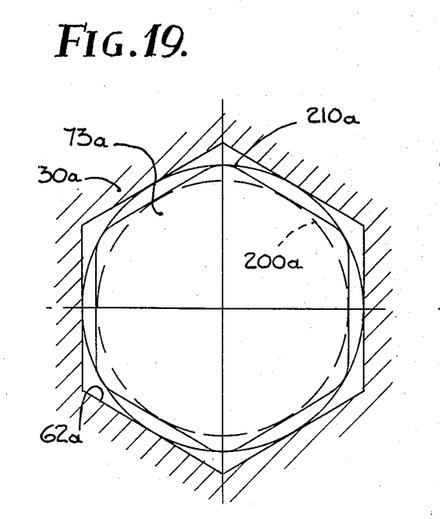
Figs. 19 to 22, inclusive, are views corresponding to Figs. 15 to 18, inclusive, of another cross-sectional shape of pencil or crayon and associated supporting member.
Figure 20:
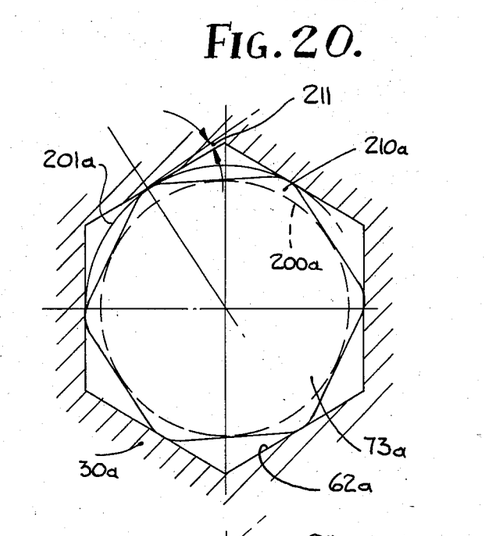

The foregoing disadvantages of the use of polygonal pencils or crayons and associated polygonal bores having six or more sides, or four or less sides, are avoided by providing a pencil 73 of pentagonal cross-section acting within an associated pentagonal bore 62. In Figs. 17 and 18, a pencil of pentagonal cross-section having sharp corners 210b is illustrated operating within a companion pentagonal bore, with the required minimum clearance 202 therebetween. It is evident from Fig. 17 that each corner segment 215b bounded between intersecting sides 203 of the pentagon and the inscribed circle 200 is much less than the corner segments 215 of the square cross-sectional arrangement. Accordingly, substantially less material is wasted during the sharpening action, since, as indicated above, the material outside of the inscribed circle 200 must be removed during the sharpening action. In addition, the included angle between the intersecting sides 203 of the pentagon is 108 degrees, which provides a much stronger corner 210b than is present with the ninety degree angle of the square corner 210a or the sixty degree angle of each triangular corner. Accordingly, fracturing of the corner segments 215b and of other parts of the pencil 73 do not occur under the action of the sharpener 28. The edge 114 of the sharpener reduces the pencil to the desired size of chips, which are then readily removed from the sharpener at its forward opening 120.

The angle of attack 211b of each crest or vertex 210b in the pentagonal cross-sectional pencil 73 against the sides 204 of the companion bore 62 of the supporting member 30 is much greater than exists in the hexagonal cross-section. Therefore, each corner 210b will not wedge against the associated side 204 of the bore under the action of the torque transmitted by the sharpener 28 to the crayon or pencil. Since each corner segment 215b extends outwardly beyond the inscribed circle 200 of the pencil to a much greater extent than the hexagonal pencil illustrated in Figs. 21 and 22, the corners 210b cannot be dubbed and the pencil twisted through or rotated within the socket 62. Thus, with the pentagonal shape of pencil 73 and associated socket 62, it is prevented from turning within the socket, but will remain slidably splined to the supporting member 30, so as to be shifted freely axially of the supporting member by the spring 74 and associated plunger 68. In other words, the positive slidable keying or splining of the pencil 73 to the supporting member 30 will be maintained under all operating conditions of the sharpening apparatus.

Figure 15:
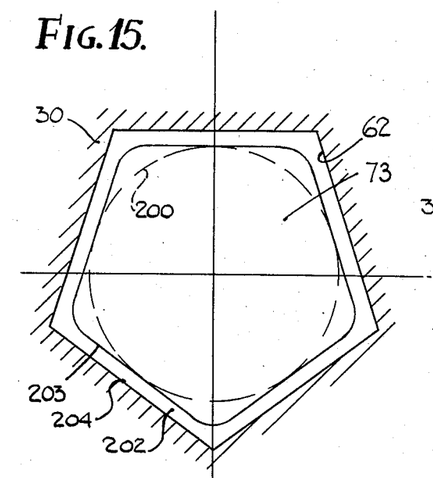
Figs. 15 to 18, inclusive, are enlarged diagrammatic cross-sectional views through the pencil and associated supporting member, disclosing different operative positions of the pencil in the supporting member.
Figure 16:
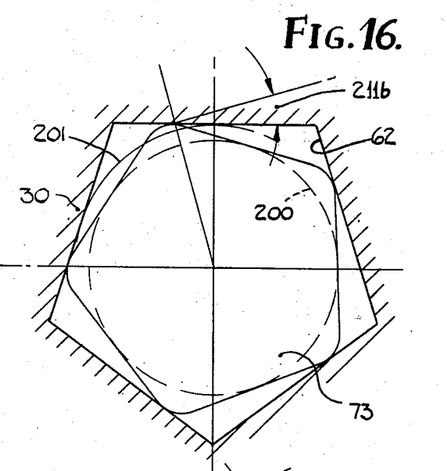

The foregoing advantages are retained, despite the rounding of the corners 210b of the pentagonal pencil, such as illustrated in Figs. 15 and 16. The force transmitted between each rounded corner 210b and the contacting wall 204 is acting at a much greater angle to the wall than in the hexagonal construction, and the extent of outward projection 215b of each corner beyond the inscribed circle 201 of the pentagonal bore 62 is of sufficiently great extent as to prevent the pencil or crayon 73 from being twisted through the bore 62, or becoming wedged against its side walls 204, as is true of the hexagonal arrangement.

It is, accordingly, apparent that the pencil of pentagonal cross-section and associated bore of pentagonal cross-section insures the proper slidable splined arrangement of the pencil 73 within the companion supporting member 30, avoiding the defects of polygonal shapes having more than five sides and also of polygonal shapes having less than five sides. As a practical matter, the pentagonal shape is the only one which will function properly in an eyebrow pencil apparatus, such as illustrated, or in any similar apparatus, particularly one in which the pencil must be made of relatively soft or relatively weak material.

The relationship between the pencil 73 and the associated supporting member 30 in which it is slidably and non-rotatably mounted offers a distinct advantage since the pencil is supported against rotation within the bore 62 of the supporting member 30 along substantially its entire length. Accordingly, the torque transmitted between the pencil 73 and the supporting member 30 is distributed over an exceedingly large contacting region between the pencil and the supporting member. There is no concentration of such torque over a relatively short length, which, particularly under repeated sharpening actions, might be cumulative and weaken the pencil to the degree at which it will fail. In addition, it is to be noted that there is a relatively short forward projection of the pencil beyond the forward end of the supporting member 30, which minimizes the bending action of the sharpener 28 upon the pencil, and thereby precludes the opportunities for its breaking under the sharpening strains imparted to it.

The inventor claims:

In combination: a supporting member having an elongate bore therein of equilateral pentagonal cross-section; an elongate eyebrow pencil of relatively soft material having an equilateral pentagonal cross-section and slidable axially in said bore, the diameter of the inscribed circle of said bore tangent to its sides being from about twelve percent to about sixteen percent greater than the diameter of the inscribed circle of said pencil tangent to its sides; a cap adapted to be applied in assembled relation to said supporting member; and sharpening means in said cap adapted to be rotated by said cap against said pencil, upon placing of said cap in said assembled relation, to cut a generally conical end portion on said pencil; said pencil being movable laterally in said supporting member upon removal of said cap and sharpening means from said assembled relation, whereby said sharpening means clears said pencil without damage thereto.

References Cited in the file of this patent

UNITED STATES PATENTS

| 1,299,923 | Easton | Apr. 8, 1919 |
| 1,595,948 | King | Aug. 10, 1926 |

FOREIGN PATENTS

| 1,831 | Great Britain | Aug. 8, 1859 |